Figure 1:
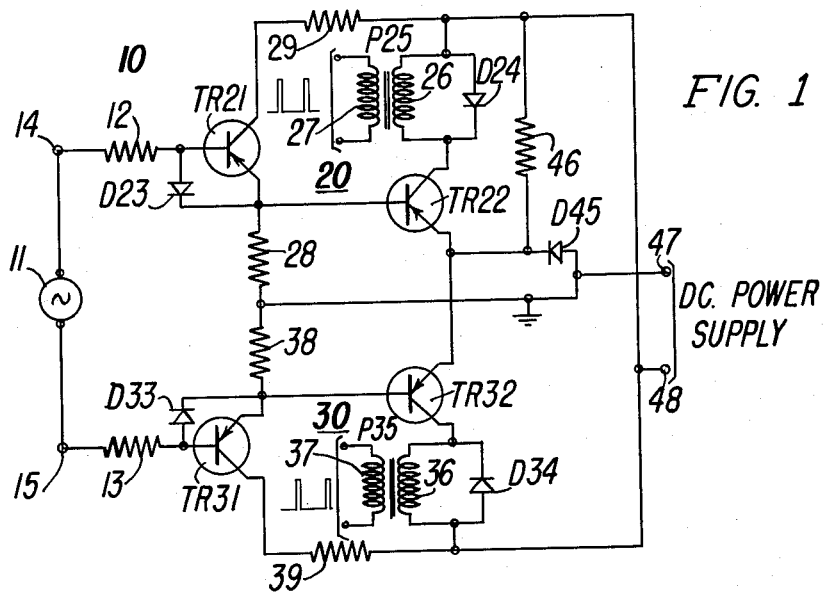

Nov. 6, 1962 — A. W. WILKERSON — 3,062,969
HIGH ENERGY PULSE GENERATOR CIRCUIT
Filed Dec. 19, 1958 — 2 Sheets-Sheet 1

INPUT SIGNAL VOLTAGE

RISE TIME DETERMINED BY $\frac{L}{R}$ TIME CONSTANT OF P35 AND RESISTOR 39.

SLOW FALL TIME BECAUSE OF DAMPING ACTION OF DIODE D34.

CURRENT IN PRIMARY 36 OF P35

VOLTAGE IN SECONDARY 37 OF P35.

INVENTOR.
Alan W. Wilkerson
BY
Byron Hume Groen & Clement
Attys.

Nov. 6, 1962  A. W. WILKERSON  3,062,969
HIGH ENERGY PULSE GENERATOR CIRCUIT
Filed Dec. 19, 1958  2 Sheets-Sheet 2

INVENTOR.
Alan W. Wilkerson
BY
Byron Hume Groen & Clementi
Attys.

United States Patent Office 3,062,969
Patented Nov. 6, 1962

3,062,969
HIGH ENERGY PULSE GENERATOR CIRCUIT
Alan W. Wilkerson, Racine, Wis., assignor to The Louis
Allis Co., Milwaukee, Wis., a corporation of Wisconsin
Filed Dec. 19, 1958, Ser. No. 781,707
12 Claims. (Cl. 307—88.5)

The present invention relates to high energy pulse generator circuits and particularly to pulse generator circuits useful for firing electron tube rectifiers of the mercury arc type and of the gas filled type.

Rectifiers of the types mentioned all include a start electrode for initiating emission of electrons between the anode and cathode elements of the tubes. In each instance, the power supplied to the start electrode must be of sufficient magnitude to cause initial emission of electrons. One form of mercury arc rectifier is the excitron including an excitation anode to which a high energy pulse generator circuit must be connected for purposes of supplying the required excitation for rendering the tube conductive. Another type of mercury arc rectifier is the ignitron which is provided with an ignitor electrode supplied from a high energy pulse generator circuit. The thyratron is a kind of gas filled rectifier tube including a control grid to which the high energy pulse generator is connected. A pair of any of these types of rectifiers are quite often employed for purposes of achieving full wave rectification, in which case it is necessary that the pulse generator circuit produce two chains of pulses that are exactly 180° out of phase with one another.

It is a general object of the present invention to provide a new and improved high energy pulse generator circuit of simple design and high dependability useful for firing triggered rectifier tubes.

A more specific object of the invention is to provide an improved pulse generator circuit capable of providing a high power output from a low power input and capable of a substantially trouble free operation for a substantial period.

An additional object of the invention is to provide a high efficiency pulse generator circuit capable of producing two chains of balanced output pulses that are displaced exactly 180° from one another.

An additional object of the invention is to produce a high efficiency transistor pulse generator capable of producing a high power output from a low power input and characterized as having a high input resistance thereby to prevent loading of the power source.

A specific object of the invention is to provide a new and improved transistorized generator circuit capable of supplying high energy pulses for use in firing excitron tubes connected in a full wave rectifier circuit and to provide these pulses in predetermined phase relationship with respect to the alternating current power source providing the anode voltage to the excitrons.

Further objects and features of the invention pertain to the particular structure and arrangements whereby the above-identified objects and other objects of the invention are achieved.

Figure 2A:
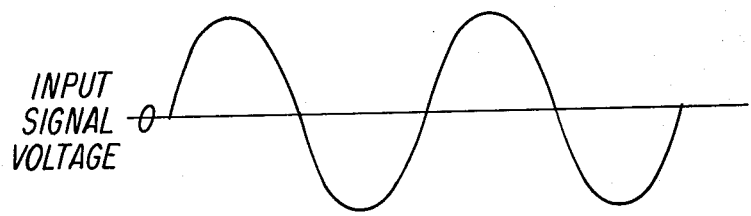
Figure 2B:
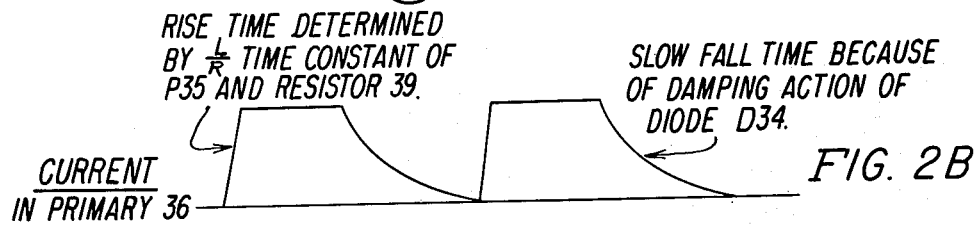
Figure 2C:
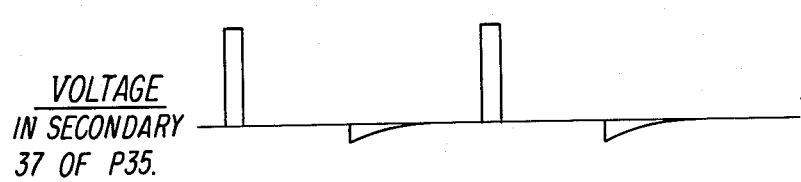
Figure 3:
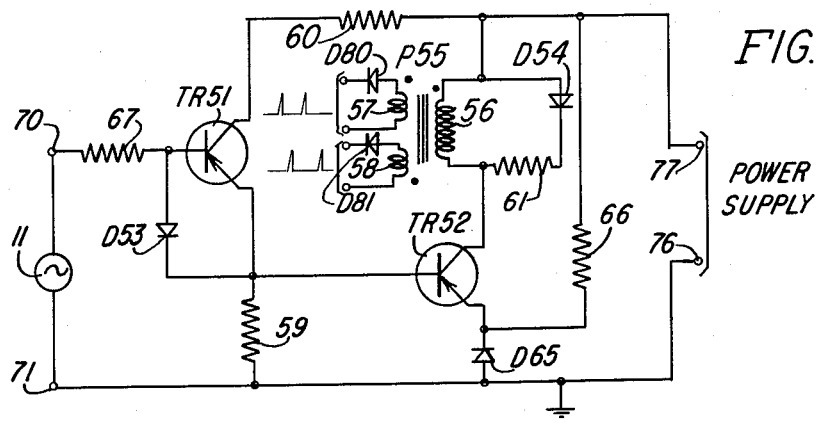
Figure 4A:
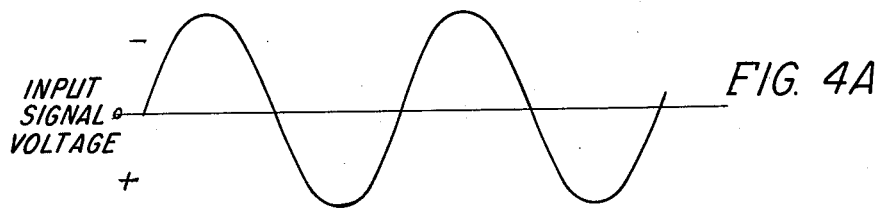
Figure 4B:
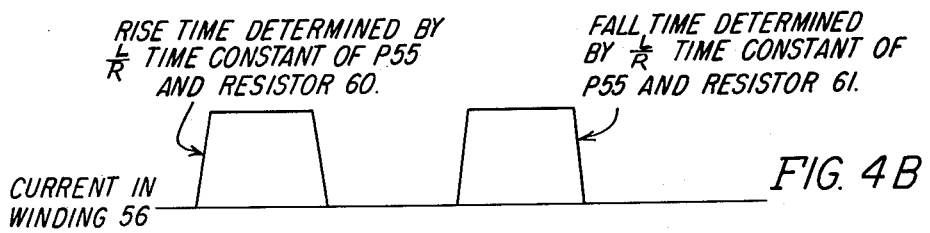
Figure 4C:
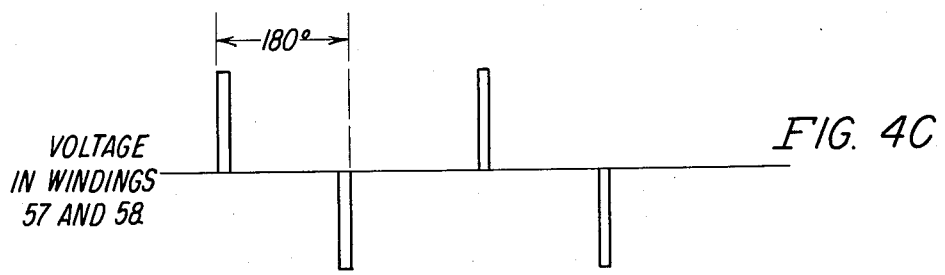

The invention, both as to its arrangement and mode of operation, will be better understood by reference to the following disclosure and to the drawings forming a part thereof wherein:

FIGURE 1 is a schematic representation of the transistorized pulse generator circuit in accordance with the invention providing two chains of pulses phased exactly 180° from one another;

FIGURES 2A, 2B, and 2C illustrate the wave forms occurrent in the circuit of FIGURE 1;

FIGURE 3 is a modification of the arrangement illustrated in FIGURE 1 wherein the output pulses are not exactly but only approximately phased 180° from one another; and FIGURES 4A, 4B and 4C illustrate the wave forms occurrent in the circuit of FIGURE 3.

Referring now to the drawings, there is shown in FIGURE 1, a balanced output pulse generator circuit 10 in accordance with the invention made up of a first stage 20 and a second stage 30 connected in series across a source of alternating current power 11. The stage 20 includes a transistor TR21 and a transistor TR22, both shown to be of the PNP type, diode D23, diode D24, and a pulse transformer P25. The stage 30 is identical in structure to the stage 20 and includes a transistor TR31, transistor TR32, diodes D33 and D34 and a pulse transformer P35. Power is supplied to both stages of the circuit from a direct current source by means of a biasing resistor 46 and a diode D45. In the quiescent state, no alternating current signal is applied to the circuit from the source 11 so that the transistors TR21 and TR31 are substantially non-conductive in the emitter-base paths thereof. A small leakage current flows from ground potential at the positive electrode of the direct current power supply through the small resistance 28, the emitter-collector path of the transistor TR21, and a resistor 29 to negative battery potential, and a corresponding leakage current flows from ground potential through the small resistance 38, the emitter-collector path of the transistor TR31 and the resistor 39 to the negative terminal of the D.C. power supply. In this circumstance, the base electrode of the transistor TR22 which is connected to the emitter electrode of the transistor TR21 is established at approximately ground potential and the base electrode of the transistor TR32 which is connected to the emitter electrode of the transistor TR31 is also at approximately ground potential. The emitter electrodes of these transistors are biased at a potential negative with respect to the base by the current flow from ground potential through the constant voltage diode D45 and the biasing resistor 46 to negative battery potential thereby rendering the transistors TR22 and TR32 also non-conductive in the emitter-base paths thereof. Thus, when no signal is applied to the circuit at the signal generator 11, the transistors TR21, TR22, TR31 and TR32 are cut-off. Accordingly, there is no current flow through the primary windings of the pulse transformers P25 and P35.

Assuming now that an alternating current signal from the source 11 as shown in FIGURE 2A is applied to the circuit, the stages 20 and 30 alternately are rendered conductive on alternate half cycles. Specifically, considering the half cycle when the input terminal 14 is rendered positive with respect to the input terminal 15, a very small signal current flows from the source 11 at the terminal 14 through the loop including the resistor 12, the diode D23, the resistors 28 and 38, the emitter-base path of the transistor TR31 and the resistor 13 to the terminal 15. The emitter-base current flow into the transistor TR31 renders that transistor conductive so that a substantial current flows in a path from ground potential at the positive electrode 47 of the D.C. source, through the resistor 38, the emitter-collector path of the transistor TR31 and the resistor 39 to the negative electrode 48 of the power supply. The current flow through the resistor 38 causes a voltage drop that biases the base electrode of the transistor TR32 negative with respect to the emitter electrode thereof so that a current flows in the emitter-base path thereof. Accordingly, the transistor TR32 is rendered full conductive so as to cause a substantial current flow in a path from ground potential at electrode 47 through the constant voltage diode D45, the emitter-collector path of the transistor TR32, the primary winding of the pulse transformer P35 to the negative terminal 48 of the D.C.

power supply. The current flow in this loop increases rapidly until it is limited by the supply voltage from the D.C. power supply and the resistance of the primary winding 36 illustrated by FIGURE 2B thereby causing a pulse to appear across the terminals of the secondary winding 37 of the pulse transformer as shown in FIGURE 2C.

Inasmuch as operation of the transistor TR32 is such that it is quickly saturated and draws a full emitter-collector current during its period of conductivity, the pulse across the terminals of the secondary winding 37 is peaked and corresponds closely to a square wave as illustrated in FIGURE 1. This high energy pulse may be used to fire a rectifier tube of the type mentioned. During the diminishing portion of the half cycle signal and when the input electrode 15 establishes the base potential of the transistor TR31 positive with respect to the potential on the emitter electrode thereof, the transistor TR31 is cut-off so that the current flow through the resistor 38 is substantially diminished thereby again establishing the base electrode of the transistor TR32 positive with respect to the emitter electrode thereof. Accordingly, the transistor TR32 is rendered non-conductive and the current flow through the primary winding 36 of the pulse transformer 35 rapidly decreases to zero. To damp the inductive voltage surge that always accompanies the interruption of current flow through the winding of a transformer, the diode D34 is connected in parallel with the winding 36 thereby to provide a low impedance path for dispersing the surge voltage. This is illustrated by the gradual slope in the trailing portion of each pulse in FIGURE 2B.

During the next half cycle, when the input terminal 15 is rendered positive with respect to the input terminal 14 a current path is completed from the source 11 at the terminal 15 through the resistor 13, the diode D33, the resistors 38 and 28, the emitter-base path of the transistor TR21 and the resistor 12 to terminal 14. Accordingly, the transistor TR21 is rendered conductive in the emitter-base path and a substantial current is drawn from ground potential through the resistor 28, the emitter-collector path of the transistor TR21 and resistor 29 to the negative terminal of the D.C. power supply thereby biasing the base electrode of the transistor TR22 negative with respect to the emitter electrode and rendering that transistor conductive. Thereupon a large current flow is experienced from ground potential at electrode 47 through the constant voltage diode D45, the emitter-collector path of the transistor TR22, the primary winding 26 to the pulse transformer P25 to the negative electrode of the D.C. power supply. As the transistor TR22 is rendered full conductive at this time, the current rises rapidly in the primary winding 26 of the pulse transformer thereby producing a pulse across the terminals of the secondary winding 27. This output pulse is of the same characteristic as that produced across the secondary winding 37 of the pulse transformer 36 so that it is peaked and conforms to a square wave. This output pulse can also be employed for purposes of firing rectifiers of the type mentioned.

Inasmuch as the two-pulse outputs of the secondary windings of the pulse transformers P25 and P35, respectively, are exactly 180° out of phase with regards to one another, these pulses can be used for purposes of firing two excitrons, for example, connected in a full wave rectifier circuit.

A variation of the arrangement shown in FIGURE 1 is illustrated in FIGURE 3 which circuit is comprised essentially of but one of the mentioned stages shown in the arrangement of FIGURE 1. Specifically, the circuit 50 of FIGURE 3 includes a transistor TR51, a transistor TR52, a diode D53, a diode D54, and a pulse transformer P55 including a primary winding 56 and secondary windings 57 and 58. Additionally, a constant voltage diode D65 and a biasing resistor 66 are provided for purposes of applying proper biasing potentials to the circuit from the D.C. power supply source.

Considering now the operation of the circuit of FIGURE 3, and the circumstance wherein the applied alternating current signal shown in FIGURE 4A renders the input terminal 70 positive with respect to the input terminal 71, during this half cycle, the circuit is not operated inasmuch as a shunt path is completed from the source 11 at the input terminal 70 through resistor 67, the diode D53 and the resistor 59 to the input terminal 71. During the next half cycle when the input terminal 71 is rendered positive with respect to the input terminal 70, the current path is completed from the source 11 at the input terminal 71 through the resistor 59 and the emitter-base path of the transistor TR51 and the resistor 67 to the input terminal 72, whereby the transistor TR51 is rendered conductive. Accordingly, a substantial current flow is experienced from ground potential through the resistor 59 and the emitter-collector path of the transistor TR51 and the resistor 60 to the negative terminal of the D.C. power supply. Because of the substantial current flow through the resistor 59, the base of the transistor TR52 is biased negative with respect to the emitter electrode thereof whereby the transistor TR52 is rendered conductive in the emitter-base path and a saturating current is drawn from ground potential at the positive terminal 76 from the power supply through the constant voltage diode D65, the emitter-collector path of the transistor TR52 and the primary winding 56 of the pulse transformer 55 to the negative terminal 77 of the power supply. Thus during the rising portion of the half cycle, a current surge is experienced in the primary winding 56 which produces corresponding pulses in the secondary windings 57 and 58.

During the diminishing portion of the half cycle, the rate at which current decreases in the primary of pulse transformer P55 is controlled by diode D54 and resistor 61 connected across the terminals thereof. Resistor 61 is selected so that this rate of decrease in the primary winding 56 is equal to the rate of increase therein at the start of the half cycle. Therefore, a second pulse of a polarity opposite to the first produced pulses appears in each of the windings 57 nad 58.

By arranging the windings 56, 57 and 58 on the transformer core and providing terminals in the manner as indicated in the FIGURE 3 and including a diode D80 in series with the winding 57 and a diode D81 in series with the winding 58 as indicated, only the first produced pulse in each half cycle will appear across the terminals of winding 57 and only the second produced pulse in each half cycle will appear across the terminals of winding 58. Inasmuch as these two pulses occur at the beginning and at the end, respectively, of a half cycle, they are phase displaced, not exactly, but only approximately 180°. The relationship between the current in the primary winding 56 and the voltages at the output terminals of the secondary windings 57 and 58 are shown in FIGURES 4B and 4C, respectively.

The advantages of the arrangements disclosed herein are many, one being that the circuit is substantially insensitive to ambient temperature changes inasmuch as the transistors are always operated either in the cut-off or saturated state. Further, because the transistors are operated in either one of the two extreme states, the power dissipation in the transistors is very low. Specifically, high voltage and high current conditions do not occur simultaneously, so that the transistors handle amounts of power many times their rated dissipation and small transistors act to produce the considerable power output. In addition, as the circuit is characterized as having a high input resistance and the power in the system producing the high energy pulses is derived essentially from a D.C. power supply, it is necessary that the signal source for controlling the operation of the circuit have only a small power output rating. Through the use of this circuit an increased efficiency pulse generator is achieved which is capable of providing substantial trouble free operation for a sustained period of time.

While the arrangement described herein is at present considered to be preferred, it is understood that variations and modifications may be made therein, such as modifying circuits to utilize NPN type transistors, without departing from the scope of the invention, and it is intended to cover in the appended claims all such variations and modifications as fall within the true spirit and scope of the invention.

What is claimed is:

1. A pulse generator circuit comprising a source of power including a first terminal and a second terminal, voltage divider means completing a first connection across the terminals of said power source for providing a constant voltage and variable current at its center-tap, an electron flow device including an input electrode and an output electrode and a control electrode, a pulse transformer, a second connection from said center-tap to the second terminal of said power source via the input electrode and the output electrode of said electron flow device and a winding of said pulse transformer, means for biasing said electron flow device non-conductive at said control electrode, a source of control signals, and control means connected to said control electrode and responsive to each control signal from said signal source for biasing said electron flow device conductive at said control electrode to render said device full conductive between the input and output electrodes thereof, whereby a substantial change in curernt flow is experienced in said second connection during the interval of each of said control signals thereby porducing high energy pulses in the output of said pulse transformer.

2. A pulse generator circuit comprising a source of power including a first terminal and a second terminal, a voltage divider including a constant voltage diode device and a load device completing a first connection across the terminals of said power source, a saturable electron flow device including an input electrode and an output electrode and a control electrode, a pulse transformer, a second connection from the junction between said diode device and said load device to the second terminal of said power source via the input electrode and the output electrode of said electron flow device and a winding of said pulse transformer, means for biasing said electron flow device non-conductive at said control electrode, a source of control signals, and control means connected to said control electrode and responsive to each control signal from said signal source for biasing said electron flow device to saturable conduction at said control electrode to render said device full conductive between the input and output electrodes thereof, whereby a substantial current flow is experienced in said second connection during the interval of each of said control signals thereby producing high energy pulses in the output of said pulse transformer.

3. A pulse generator circuit comprising a source of power including a first terminal and a second terminal, a constant voltage diode device, a resistance device, a first connection from the first terminal to the second terminal of said source via said diode device and said resistance device, a saturable electron flow device including an input electrode and an output electrode and a control electrode, a pulse transformer, a second connection from the junction between said diode device and said resistance device to the second terminal of said power source via the input electrode and the output electrode of said electron flow device and a winding of said pulse transformer, a third connection from the first terminal of said power source to said control electrode, thereby to bias said electron flow device non-conductive between said input and control electrodes, a source of control signals, and control means connected to said control electrode and responsive to each control signal from said signal source for biasing said electron flow device to saturable conduction between the input and output electrodes thereof during the interval of said control signal, whereby a substantial change in current flow is experienced in said second connection with the change in state of said electron flow device from non-conduction to conduction and high energy pulses are produced in the output of said pulse transformer.

4. A pulse generator circuit comprising a source of power including a first terminal and a second terminal, a constant voltage diode device, a first resistance device, a first connection from the first terminal to the second terminal of said source via said diode device and said first resistance device, a saturable first electron flow device including an input electrode and an output electrode and a control electrode, a pulse transformer, a second connection from the junction between said diode device and said first resistance device to the second terminal of said power source via the input electrode and the output electrode of said first electron flow device and a winding of said pulse transformer, a second resistance device, a third connection from the first terminal of said power source to the control electrode of said first electron flow device via said second resistance device thereby to bias said electron flow device non-conductive between said input and control electrode, a second electron flow device including an input electrode and an output electrode and a control electrode, a fourth connection from said control electrode of said first electron flow device to the second terminal of said power source via the input electrode and the output electrode of said second electron flow device, a source of control signals, and means connecting said source of signals to the control electrode of said second electron flow device for rendering said device full conductive between the input and output electrodes thereof responsive to the occurrence of each control signal, thereby to cause current flow through said second resistance device and to bias said first electron flow device to saturable conduction between the input and output electrodes at the control electrode thereof during the interval of said control signal, whereby a substantial change in current flow is experienced in said second connection with the change in state of said electron flow device from non-conduction to conduction and high energy pulses are generated in the output of said pulse transformer.

5. A pulse generator circuit comprising a source of power including a first terminal and a second terminal, a constant voltage diode device, a first resistance device, a first connection from the first terminal to the second terminal of said source via said diode device and said first resistance device, a saturable first electron flow device including an input electrode and an output electrode and a control electrode, a pulse transformer, a second connection from the junction between said diode device and said first resistance device to the second terminal of said power source via the input electrode and the output electrode of said first electron flow device and a winding of said pulse transformer, a first unidirectional current device connected across the terminals of the primary winding of said pulse transformer, a second resistance device, a third connection from the first terminal of said power source to the control electrode of said first electron flow device via said second resistance device, thereby to bias said electron flow device non-conductive between said input and control electrodes, a second electron flow device including an input electrode and an output electrode and a control electrode, a fourth connection from said control electrode of said first electron device to the second terminal of said power source via the input electrode and the output electrode of said second electron device, a source of control signals, and means connecting said source of signals to the control electrode of said second electron flow device for rendering said device full conductive between the input and output electrodes thereof responsive to the occurrence of each control signal, thereby to cause current flow through said second resistance device and to bias said first electron flow device to saturable conduction between the input and output electrodes at the control electrode thereof during the interval of control signal, whereby a substantial change in current flow is experienced in said electron flow device with the change in state of said first electron flow device from non-conduction to conduction and high energy pulses are generated in the output of said pulse transformer.

6. A pulse generator circuit comprising a source of power including a first terminal and a second terminal, a constant voltage diode device, a first resistance device, a first connection from the first terminal to the second terminal of said source via said constant voltage diode and said first resistance device, a saturable first semi-conductor device including an emitter electrode and a collector electrode and a base electrode, a pulse transformer, a second connection from the junction between said diode device and said first resistance device to the second terminal of said power supply via the emitter and collector electrodes of said first semi-conductor device and the primary winding of said pulse transformer, a first unidirectional current device connected across the terminals of the primary winding of said pulse transformer for diminishing reverse current flow in said primary winding, a second resistance device, a third connection from the first terminal of said power source to the base electrode of said first semi-conductor device via said second resistance device, thereby to bias said first-semi-conductor device non-conductive between said emitter and collector electrodes thereof, a second semi-conductor device including an emitter electrode and a collector electrode and a base electrode, a fourth connection from said base electrode of said first semi-conductor device to the second terminal of said power source via the emitter and collector electrodes of said second semi-conductor device, a source of control signals, and means connecting said source of signals to the base electrode of said second semi-conductor device for rendering said device full conductive between the emitter and collector electrodes at the base electrode thereof responsive to the occurrence of each control signal, thereby to cause current flow through said second resistance device and to bias said first semi-conductor device to saturable conduction between the emitter and collector electrodes at the base electrode thereof during the interval of said control signal, whereby a substantial change in current flow is experienced in said second connection with the change in state of said first semi-conductor device from non-conduction to conduction and corresponding high energy pulses are produced in the output of said pulse transformer.

7. A pulse generator circuit comprising a source of power including a postive terminal and a negative terminal, a constant voltage diode device, a first resistance device, a first connection from the positive terminal to the negative terminal of said source via said diode device and said first resistance device, a saturable first semi-conductor device including an emitter electrode and a collector electrode and a base electrode, a pulse transformer, a second connection from the junction between said diode device and said first resistance device to the negative terminal of said power supply via the emitter and collector electrodes of said first semi-conductor device and the primary winding of said pulse transformer, a first unidirectional current device connected across the terminals of the primary winding of said pulse transformer for permitting a current flow in a direction toward the collector electrode of said first semi-conductor device, a second resistance device, a third connection from the positive terminal of said power source to the base electrode of said first semi-conductor device via said second resistance device thereby to bias said first semi-conductor device non-conductive between said emitter and collector electrodes thereof, a second semi-conductor device including an emitter electrode and a collector electrode and a base electrode, a fourth connection from said base electrode of said first semi-conductor device to the negative terminal of said power source via the emitter and collector electrodes of said second semi-conductor device, a second unidirectional current device connected for providing a current path from the base electrode to the collector electrode of said second semi-conductor device, a source of alternating current control signals connected between the positive electrode of said power source and the base electrode of said second semi-conductor device for rendering said device full conductive in the emitter-collector path during each positive half cycle of said alternating current control signals thereby to cause current flow through said second resistance device and to bias said first semi-conductor device to saturable conduction between the emitter and collector electrodes at the base electrode thereof during the interval of said positive half cycle, whereby a substantial change in current flow is experienced in said second connection with change in state of said first semi-conductor device from non-conduction to conduction and high energy pulses are produced in the output of said pulse transformer.

8. The pulse generator circuit set forth in claim 7 wherein said first and second semi-conductor devices are PNP type transistors.

9. A pulse generator circuit comprising a source of power including a positive terminal and a negative terminal, a constant voltage diode device, a first resistance device, a first connection from the positive terminal to the negative terminal of said source via said diode device and said first resistance device, a pair of saturable first semi-conductor devices each including an emitter electrode and a collector electrode and a base electrode, a pair of pulse transformers, a pair of second connections each extending from the junction between said diode device and said first resistance to the negative terminal of said power supply via the emitter and collector electrodes of a corresponding first semi-conductor device and the primary winding of a corresponding pulse transformer, a pair of first unidirectional current devices each connected across the terminals of the primary winding of a corresponding pulse transformer for permitting a current flow in a direction towards the collector electrode of the corresponding first semi-conductor device, a pair of second resistance devices, a pair of third connections each extending from the positive terminal of said power source to the base electrode of a corresponding first semi-conductor device via one of said second resistance devices, thereby to bias each of said first semi-conductor devices non-conductive between the emitter and collector electrodes thereof, a pair of second semi-conductor devices each including an emitter electrode and a collector electrode and a base electrode, a pair of fourth connections each extending from the base electrode of one of said first semi-conductor devices to the negative terminal of said power source via the emitter and collector electrodes of a corresponding second semi-conductor device, a pair of second unidirectional current devices each connected for providing a current path from the base electrode to the collector electrode of a corresponding second semi-conductor device, a source of alternating current control signals connected between the base electrodes of said pair of first semi-conductor devices for rendering said devices alternately full conductive between the emitter and collector electrodes on alternate half cycles thereby to cause current flow through corresponding second resistive devices and to bias the connected first semi-conductor devices to saturable conduction between the emitter and collector electrodes at the base electrodes thereof during the interval of the corresponding half cycle, whereby a substantial change in current flow is experienced in each of said second connections with the change in state in the corresponding first semi-conductor device from non-conduction to conduction and from conduction to non-conduction and high energy pulses are generated in the output of the connected pulse transformer.

10. A pulse generator circuit comprising a source of power including a first terminal and a second terminal, a constant voltage diode device, a first resistance device, a first connection from the first terminal to the second terminal of said source via said diode device and said first resistance device, a saturable first semi-conductor device including an emitter electrode and a collector electrode and a base electrode, a pulse transformer including a primary winding and a first secondary winding and a second secondary winding, a second connection from the junction between said diode device and said first resistance device to the second terminal of said power supply via the emitter and collector electrodes of said first semi-conductor device and the primary winding of said pulse transformer, a second resistance device, a third connection from the first terminal of said power source to the base electrode of said first semi-conductor device via said second resistance device, thereby to bias said first semi-conductor device non-conductive between said emitter and collector electrodes thereof, a second semi-conductor device including an emitter electrode and a collector electrode and a base electrode, a fourth connection from said base electrode of said first semi-conductor device to the second terminal of said power source via the emitter and collector electrodes of said second semi-conductor device, a source of control signals, means connecting said source of signals to the base electrode of said second semi-conductor device for rendering said device full conductive between the emitter and collector electrodes at the base electrode thereof responsive to the occurrence of each control signal, thereby to cause current flow through said second resistance device and to bias said first semi-conductor device to saturable conduction between the emitter and collector electrodes at the base electrode thereof during the interval of said control signal, whereby a substantial change in current flow is experienced in said second connection with the change in state of said first semi-conductor device from non-conduction to conduction and from conduction to non-conduction, said changes in current flow through the primary winding of said second connection producing a first voltage pulse and a second voltage pulse at the end therein each of said secondary windings, and a first unidirectional device and a third resistance device connected across the terminals of said primary winding to regulate the rate at which the current flow diminishes to correspond to the rate at which the current flow rises thereby to render said first and second voltage pulses of equal amplitude and duration.

11. The pulse generator arrangement set forth in claim 10 further including a unidirectional current device in series with said first secondary winding to permit a current flow therethrough only during the occurrence of each first voltage pulse and including a unidirectional current device in series with said second secondary winding to permit a current flow therethrough only during the occurrence of each second voltage pulse.

12. The pulse generator arrangement set forth in claim 11 wherein said source of control signals provide chain signals having 50% duty cycle whereby said first voltage pulse at said first secondary winding is phase displaced from said second voltage pulse at said second secondary winding by approximately 180°.

References Cited in the file of this patent
UNITED STATES PATENTS

| | | |
|---|---|---|
| 2,644,895 | Lo | July 7, 1953 |
| 2,862,171 | Freeborn | Nov. 25, 1958 |
| 2,892,143 | Sommer | June 23, 1959 |

FOREIGN PATENTS

| | | |
|---|---|---|
| 161,448 | Sweden | Nov. 26, 1957 |